3,752,893
METHOD FOR INHIBITING GASTRIC ACID
SECRETION IN MAMMALS
Henry George Roscoe, Montvale, N.J., and Donald
Arthur Blickens, Suffern, and David Kupfer, Pearl
River, N.Y., assignors to American Cyanamid Company, Stamford, Conn.
No Drawing. Filed Apr. 2, 1971, Ser. No. 130,811
Int. Cl. A61k 27/00
U.S. Cl. 424—270                    5 Claims

ABSTRACT OF THE DISCLOSURE

This disclosure describes compositions of matter useful for inhibiting the formation of histamine in mammals and the method of inhibiting histamine formation in mammals therewith, the active ingredients of said compositions of matter being certain substituted 3-(2-amino-4-thiazolyl)indoles.

BRIEF SUMMARY OF THE INVENTION

This invention relates to novel compositions of matter useful for inhibiting the formation of histamine in mammals. More particularly, it relates to therapeutic compositions containing certain substituted 3-(2-amino-4-thiazolyl)indoles which inhibit histamine formation in mammals. The invention includes the new compositions of matter and the method of inhibiting histamine formation in mammals therewith.

Our invention is based upon the discovery that certain substituted 3-(2-amino-4-thiazolyl)indoles are potent inhibitors of the enzyme histidine decarboxylase with resultant inhibition of histamine formation in mammals. The mode of action of the active compounds of the present invention thus differs from that of known antihistaminic compounds which ordinarily merely counteract the existing released or formed histamine. The substituted 3-(2-amino-4-thiazolyl)indoles of the present invention may be represented by the following general formula:

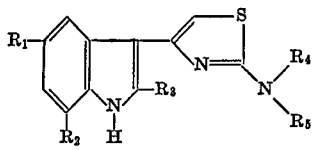

wherein $R_1$ is hydrogen, methyl, ethyl, methoxy or ethoxy; $R_2$ is hydrogen, methyl or ethyl; $R_3$ is hydrogen, methyl or ethyl; $R_4$ is hydrogen, methyl or ethyl; and $R_5$ is hydrogen, methyl or ethyl.

The decarboxylation of histidine by the specific enzyme histidine decarboxylase results in the formation of histamine in mammals. It is well established that histamine is implicated in a number of physiological functions including, for example, the nervous system, peripheral circulation, gastric hyperacidity, and allergic manifestations such as hay fever. The novel compositions of the present invention are thus also useful as gastric acid secretion inhibitors and therefore are of interest as potential anti-ulcer agents.

DETAILED DESCRIPTION OF THE INVENTION

The substituted 3-(2-amino-4-thiazolyl)indoles of the present invention form non-toxic acid-addition salts with a variety of pharmaceutically acceptable organic and inorganic salt-forming reagents. Thus, acid-addition salts, formed by admixture of the 3-(2-amino-4-thiazolyl)indole base with one or two equivalents of an acid, suitably in a neutral solvent, are formed with such acids as sulfuric, phosphoric, hydrochloric, hydrobromic, citric, lactic, tartaric, acetic and related acids. For purposes of this invention, the substituted 3-(2-amino-4-thiazolyl)indoles are equivalent to their non-toxic acid-addition salts.

The substituted 3-(2-amino-4-thiazolyl)indoles of the vention are thus also useful as gastric acid secretaion inpresent invention may be readily prepared as set forth in the following reaction scheme:

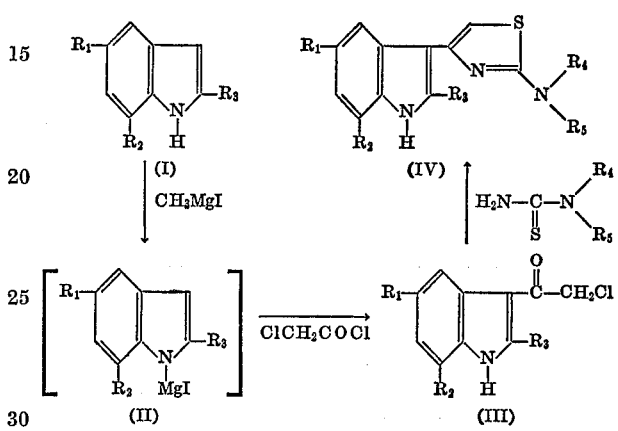

wherein $R_1$, $R_2$, $R_3$, $R_4$ and $R_5$ are as hereinabove defined. In accordance with the above reaction scheme, an appropriately substituted indole (I) is treated with methyl magnesium iodide in anhydrous diethyl ether solution at ice-bath temperature. The so formed iodo magnesyl indole (II) is not isolated but is reacted in situ with chloroacetyl chloride, also in anhydrous diethyl ether solution. The reaction mixture is stirred for a few hours at ice-bath temperature, quenched by the addition of crushed ice, and the so precipitated 3-chloroacetylindole (III) is removed. The interaction of the 3-chloroacetylindole (III) with an appropriately substituted thiourea provides the corresponding 3-(2-amino-4-thiazolyl)indole (IV). This reaction is best carried out in ethanol at reflux temperature for a few hours in the presence of an acid acceptor such as triethylamine. Dilution of the reaction mixture with water precipitates the product (IV).

The effectiveness of the active compounds of the present invention in inhibiting the activity of the enzyme histidine decarboxylase was determined as follows.

In vitro

The compounds were tested for their ability to inhibit fetal histidine decarboxylase. Specific fetal histidine decarboxylase was prepared from whole fetal rats (17–19 days gestation) according to the method of Håkanson, Biochemical Pharmacology 12, 1289 (1963) except that the fetuses were homogenized in 0.1 M acetate buffer, pH 5.5 as described by Levine and Watts, Biochemical Pharmacology 15, 841 (1966). Supernatant II fraction was used. Histidine decarboxylase activity was assayed essentially as described by Ellenbogen et al., Biochemical Pharmacology 18, 683 (1969). A 5.0 mg. portion of each inhibitor was dissolved in 0.6 ml. of dimethylformamide and 1.4 ml. of deionized water was added. After mixing, 0.05 ml. of the solution or emulsion was added to the reaction tube, producing a final inhibitor concentration of 0.0625 mg./ml. The results of this in vitro test with typical compounds of the present invention are shown in Table I below.

TABLE I

| Compound | Molar concentration | Percent inhibition |
|---|---|---|
| 3-(2-amino-4-thiazolyl)indole | $2.9 \times 10^{-4}$ | 84.3 |
| 3-(2-amino-4-thiazolyl)-5-methylindole | $2.7 \times 10^{-4}$ | 83.0 |
| 3-(2-amino-4-thiazolyl)-5-methoxyindole | $2.5 \times 10^{-4}$ | 82.7 |
| 3-2-amino-4-thiazolyl)-7-methylindole | $2.7 \times 10^{-4}$ | 77.5 |
| 3-(2-amino-4-thiazolyl)-2-methylindole | $2.7 \times 10^{-4}$ | 78.0 |
| 3-(2-amino-4-thiazolyl)-5-methoxy-2-methylindole | $2.4 \times 10^{-4}$ | 73.3 |
| 3-(2-methylamino-4-thiazolyl)indole | $2.7 \times 10^{-4}$ | 49.3 |
| 3-(2-dimethylamino-4-thiazolyl)indole | $2.6 \times 10^{-4}$ | 24.4 |
| 3-(2-methylamino-4-thiazolyl)-5-methylindole | $2.6 \times 10^{-4}$ | 32.8 |

3-(2-amino-4-thiazolyl)indole was tested further by the same in vitro methods at various concentrations to determine its effect on fetal histidine decarboxylase activity. The test showed that the inhibitory effect was directly related to concentration of the inhibitor. The results appear in Table II below.

TABLE II

| Final molar concentration of 3-(2-amino-4-thiazolyl)indole | Histidine decarboxylase activity (CPM/90 min.) | Percent inhibition |
|---|---|---|
| 0 | 6,498 | 0 |
| $1 \times 10^{-6}$ | 6,064 | 8.2 |
| $2 \times 10^{-6}$ | 5,950 | 10.0 |
| $1 \times 10^{-5}$ | 4,628 | 28.8 |
| $2 \times 10^{-5}$ | 3,633 | 44.1 |
| $1 \times 10^{-4}$ | 1,019 | 84.3 |
| $2 \times 10^{-4}$ | 409 | 93.7 |

In vivo

Stomach and lung tissue of male rats were chosen to study the effect of 3-(2-amino-4-thiazolyl)indole on histidine decarboxylase activity. Both tissues have high histamine concentrations but differ in histidine decarboxylase activity in that the stomach has high enzymic activity and the lung has low enzymic activity. Male CFE rats averaging 280 grams each were dosed by gavage with 0.5 ml./100 grams of body weight of either 0.5% low viscosity carboxymethylcellulose in saline as a control or inhibitor in carboxymethylcellulose as a treatment. The treated rats received 10 mg. of 3-(2-amino-4-thiazolyl)-indole per kilogram of body weight twice daily for varying lengths of time. On the day of sacrifice, the animals received either 10 mg./kg. of inhibitor or carboxymethylcellulose in saline in the morning and were killed three hours later.

To obtain stomach tissue the rats were killed by decapitation, the stomachs were immediately removed and cut along the lesser curvature. The contents were flushed out with saline and the pyloric area was removed and frozen. The frozen stomachs were diced with a razor blade and each stomach was homogenized in 10 ml. of ice-cold 0.1 molar potassium phosphate buffer, pH 6.6. The homogenates were centrifuged at 20,000 times gravity for 10 minutes at 4° C. The supernatants were decanted and assayed immediately by the same method described under fetal histidine decarboxylase, in vitro.

To obtain lung tissue, the rats were killed by decapitation, the lungs were immediately removed, rinsed in 0.9% saline and frozen. Each frozen lung was diced with a razor blade and homogenized with 4.0 ml. of ice-cold 0.1 molar potassium phosphate buffer, pH 6.6. The lung homogenates were centrifuged at 4° C. for 20 minutes. The supernatants were assayed immediately as described above.

The results appear in Table III below.

TABLE III

| Tissue | Treatment | Treatment duration (hours) | Activity ($14CO_2$ release in CPM/90 min./ mg. protein) | Percent inhibition |
|---|---|---|---|---|
| Stomach | Control | 27 | 812.3±85.2 | |
| | Inhibitor | | 694.2±199.9 | 14.5 |
| Do | Control | 75 | 821.0±56.5 | |
| | Inhibitor | | 551.4±66.2 | 32.8 |
| Do | Control | 243 | 1036±141 | |
| | Inhibitor | | 1096±128 | 0 |
| Lung | Control | 27 | 16.4±4.1 | |
| | Inhibitor | | 9.6±2.5 | 41.4 |
| Do | Control | 75 | 19.50±1.9 | |
| | Inhibitor | | 8.35±3.7 | 57.2 |
| Do | Control | 243 | 13.9±3.8 | |
| | Inhibitor | | 7.1±1.6 | 49.0 |

The active compounds of the present invention are useful as gastric secretion inhibitors and therefore are of interest as potential anti-ulcer agents. The in vivo inhibition of gastric free hydrochloric acid secretion in pylorus ligated rats, following the procedure of Shay et al., Gastroenterology 5, 43 (1945), was demonstrated. Injections were given intraduodenally to mimic oral dosing, since the pyloric ligation procedure precludes oral administration. Intraduodenal doses of typical compounds of the present invention were administered at 3, 10 or 40 mg./kg. of body weight and the results appear in Table IV below.

TABLE IV

| Compound (dose) | Time after administration, hr. | Percent inhibition |
|---|---|---|
| 3-(2-amino-4-thiazolyl)indole (3 mg.) | 3 | 88 |
| 3-(2-amino-4-thiazolyl)indole (10 mg.) | 3 | 89 |
| 3-(2-amino-4-thiazolyl)indole (40 mg.) | 3 | 96 |
| 3-(2-dimethylamino-4-thiazolyl)indole (3 mg.) | 3 | 66 |

The active compounds of the present invention and their non-toxic pharmaceutically acceptable acid-addition salts have thus been found to be highly useful for inhibiting the activity of histidine decarboxylase and gastric acid secretion in mammals when administered in amounts ranging from about 2 mg. to about 100 mg. per kg. of body weight per day. A preferred dosage regimen for optimum results would be from about 2 mg. to about 50 mg. per kg. of body weight per day, and such dosage units are employed that a total of from about 140 mg. of about 3.5 gm. of active ingredient for a subject of about 70 kg. body weight are administered in a 24-hour period. The compounds of the present invention may be administered by any convenient route such as orally, intraperitoneally, subcutaneously, intramuscularly or intravenously.

Compositions according to the present invention having the desired clarity, stability and adaptability for parenteral use are obtained by dissolving from 0.10% to 10.0% by weight of active compound in a vehicle consisting of a polyhydric aliphatic alcohol or mixtures thereof. Especially satisfactory are glycerin, propylene glycol and the polyethylene glycols. The polyethylene glycols consist of a mixture of non-volatile, normally liquid, polyethylene glycols which are soluble in both water and organic liquids and which have molecular weights of from about 200 to about 1500. Although the amount of active compound dissolved in the above vehicle may vary from 0.10% to 10.0% by weight, it is preferred that the amount of active compound employed be from about 3.0% to about 9.0% by weight. Although various mixtures of the aforementioned non-volatile polyethylene glycols may be employed, it is preferred to use a mixture having an average molecular weight of from about 200 to about 400.

In addition to the active compounds, the parenteral solutions may also contain various preservatives which may be used to prevent bacterial and fungal contamination. The preservatives which may be used for such purpose are, for example, myristyl-gamma-picolinium chloride, phenyl mercuric nitrate, benzalkonium chloride, phenethyl alcohol, p-chlorophenyl-glycerol ether, methyl and propyl parabens, and thimerosal. As a practical matter it is also convenient to employ antioxidants. Suitable antioxidants include, for example, sodium bisulfite, sodium metabisulfite, and sodium formaldehyde sulfoxylate. Generally, from about 0.05% to about 0.2% concentrations of antioxidant are employed.

For intramuscular injection, the preferred concentration of active compound is 25 to 50 mg./ml. of the finished compositions. They are equally adapted to intravenous administration when diluted with water or diluents employed in intravenous therapy such as isotonic glucose in appropriate quantities. For intravenous use, initial concentrations down to about 10 to 25 mg./ml. of active compound are satisfactory. They are also adapted to oral administration when diluted with drinking water.

The active compounds of the present invention may be orally administered, for example, with an inert diluent or with an assimilable edible carrier, or they may be enclosed in hard or soft shell gelatin capsules, or they may be compressed into tablets, or they may be incorporated directly with the food of the diet. For oral therapeutic administration, the compounds may be incorporated with excipients and used in the form of tablets, troches, capsules, elixirs, suspensions, syrups, wafers, chewing gum and the like. Such compositions and preparations should contain at least 0.1% of active compound. The percentage in the compositions and preparations may, of course, be varied and may conveniently be between about 5% to about 75% or more of the weight of the unit. The amount of active ingredient in such therapeutically useful compositions is such that a suitable dosage will be obtained. Preferred compositions or preparations according to the present invention are prepared so that an oral dosage unit form contains between about 10 and 200 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain, in addition to materials of the above type, a liquid carrier such as a fatty oil. Various other materials may be present as coatings or to otherwise modify the physical form of the dosage unit. For instance, tablets, pills or capsules may be coated with shellac, sugar or both. A syrup or elixir may contain the active compounds, sucrose as a sweetening agent, methyl and propylparabens as preservatives, a dye and flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

Preparation of 3-(2-amino-4-thiazolyl)indole

A magnetically stirred mixture of 476 mg. (2 mmoles) of 3-(bromoacetyl)indole [Sanna, Gazz. Chim. ital. 57, 169 (1929)], 304 mg. (4 mmoles) of thiourea, and 0.55 ml. of triethylamine in 40 ml. of ethanol was heated at reflux for 2 hours. After partial removal of solvent, water was added and the concentrate was cooled to give 349 mg. of tan solid. Recrystallization from petroleum ether gave a white solid, M.P. 166°–168° C.

EXAMPLE 2

Preparation of 3-(chloroacetyl)-5-methoxyindole

Chloroacetyl chloride (5.27 ml., 0.070 mole) in anhydrous diethyl ether (20 ml.) was added dropwise to an ice-cooled diethyl ether solution of iodo magnesyl indole prepared by treating 5-methoxyindole (10.0 gm., 0.068 mole) with methyl magnesium iodide, obtained from 1.63 gm. (0.068 mole) of magnesium and 10 gm. (0.071 mole) of methyl iodide. The reaction mixture then was magnetically stirred for 4 hours in an ice bath. Ice was added to the solution with vigorous stirring and the solid was filtered and washed well with diethyl ether. The solid was recrystallized from methanol to give 2.724 gm. of pink solid, M.P. 212°–214° C.

EXAMPLE 3

Preparation of 3-(2-amino-4-thiazolyl)-5-methoxyindole

Treatment of 3-(chloroacetyl)-5-methoxyindole (1.427 gm.) prepared as described in Example 2 with thiourea (920 mg.) by the procedure of Example 1 gave, after recrystallization from methanol, 1.138 gm. (67%) of crystals, M.P. 180°–182° C.

EXAMPLE 4

Preparation of 3-(2-amino-4-thiazolyl)-5-methylindole

The procedure of Example 3 was repeated using 1.2 gm. (5.2 mmoles) of 3-(chloroacetyl)-5-methylindole (prepared by the procedure of Example 2, but employing 5-methylindole), 760 mg. (10.4 mmoles) of thiourea and 80 ml. of ethanol. The yield after three recrystallizations from diethyl ether was 50 mg., M.P. 180°–183° C.

EXAMPLE 5

Preparation of p-(2-amino-4-thiazolyl)-7-methylindole

The procedure of Example 3 was repeated using 1 gm. (4.81 mmoles) of 3-(chloroacetyl)-7-methylindole (prepared by the procedure of Example 2, but employing 7-methylindole, 740 mg. of thiourea, 1.2 ml. of triethylamine and 75 ml. of ethanol. After refluxing for 1 hour, the solvents were removed and replaced with water. A tan solid precipitated and was collected by filtration. The yield was 1.05 gm.; recrystallization from ethanol yielded 633 mg., M.P. 245°–247° C.

EXAMPLE 6

Preparation of 3-(2-amino-4-thiazolyl)-2-methylindole

The procedure of Example 3 was repeated using 1 gm. (4.81 mmoles) of 3-(chloroacetyl)-2-methylindole (prepared by the procedure of Example 2 but employing 2-methylindole), 740 mg. (9.62 mmoles) of thiourea, 1.2 ml. of triethylamine and 75 ml. of ethanol. After refluxing for 1 hour the solvent was evaporated, water was added, and after cooling the product solidified. Recrystallization from methyl chloride yielded 631 mg., M.P. 168°–170° C.

EXAMPLE 7

Preparation of 3-(2-amino-4-thiazolyl)-5-methoxy-2-methylindole

The procedure of Example 3 was repeated using 5 gm. (0.0211 mmoles) of 3-(chloroacetyl)-5-methoxy-2-methylindole (prepared as described in Example 2 but employing 5-methoxy-2-methylindole), 3.2 gm. (0.0422 mmole) of thiourea, 5.22 ml. of triethylamine and 250 ml. of ethanol. After refluxing for 2 hours, 500 mg. of thiourea was added and the refluxing continued for 1 hour. The mixture was concentrated to about 75 ml., filtered, water was added and the precipitate which formed was collected by filtration. Recrystallization from methanol yielded 3.05 gm., M.P. 191°–193° C.

EXAMPLE 8

Preparation of 3-(2-methylamino-4-thiazolyl)indole

The procedure of Example 3 was repeated using 1.93 gm. (0.01 mole) of 3-(chloroacetyl)indole (prepared as described in Example 2 but employing unsubstituted indole), 1.8 gm. (0.02 mole) of N-methylthiourea, 2 ml. of triethylamine and 110 ml. of ethanol. After refluxing for 2 hours the mixture was evaporated almost to dryness, water was added and the precipitate was collected by filtration. Recrystallization from methyl chloride yielded 680 mg., M.P. 173°–175° C.

EXAMPLE 9

Preparation of 3-(2-dimethylamino-4-thiazolyl)indole

The procedure of Example 3 was repeated using 1.93 gm. (0.01 mole) of 3-(chloroacetyl)indole (prepared as described in Example 2 but employing unsubstituted indole), 1.35 gm. (0.013 mole) of 1,1-dimethyl-2-thiourea, 2 ml. of triethylamine and 100 ml. of ethanol. After refluxing for 2 hours, during which time 400 mg. of 1,1-dimethyl-2-thiourea was added, most of the solvents were removed and water was added. The precipitate which formed was collected by filtration and recrystallized from a mixture of ethanol and water, yielding 1.238 gm., M.P. 145°–146° C.

EXAMPLE 10

Preparation of 3-(2-methylamino-4-thiazolyl)-5-methylindole

The procedure of Example 3 was repeated using 2.07 gm. (0.01 mole) of 3-(chloroacetyl)-5-methylindole (prepared as described in Example 2 but employing 5-methylindole), 1.8 gm. (0.02 mole) of N-methylthiourea, 2 ml. of triethylamine and 130 ml. of ethanol. After refluxing for 2 hours the mixture was filtered and concentrated almost to dryness. Water was added and the resulting precipitate was collected by filtration. Recrystallization from diethyl ether yielded 220 mg., M.P. 170°–171° C.

EXAMPLE 11

Preparation of 3-(2-ethylamino-4-thiazolyl)-2-ethylindole

The procedure of Example 3 is repeated using 2.10 gm. (0.01 mole) of 3-(chloroacetyl)-2-ethylindole (prepared as described in Example 2 but employing 2-ethylindole), 2.0 gm. (0.02 mole) of N-ethylthiourea, 2 ml. of triethylamine and 130 ml. of ethanol. After refluxing for two hours, the mixture is filtered and concentrated almost to dryness. Upon the addition of water, the product precipitates and is collected by filtration.

EXAMPLE 12

Preparation of 3-(2-methylethylamino-4-thiazolyl)-5-methoxyindole

The procedure of Example 3 is repeated using 2.10 gm. (0.01 mole) of 3-(chloroacetyl)-5-methoxyindole (prepared as described in Example 2), 1.4 gm. (0.013 mole) of 1-methyl-1-ethyl-2-thiourea, 2 ml. of triethylamine and 100 ml. of ethanol. After refluxing for two hours, most of the solvent is removed and water is added. The product thereupon precipitates and is collected by filtration.

EXAMPLE 13

Preparation of 3-(2-diethylamino-4-thiazolyl)-7-methylindole

The procedure of Example 3 is repeated using 2.10 gm. (0.01 mole) of 3-(chloroacetyl)-7-methylindole (prepared as described in Example 2 but employing 7-methylindole), 1.45 gm. (0.013 mole) of 1,1-diethylthiourea, 2 ml. of triethylamine and 100 ml. of ethanol. After refluxing for two hours, most of the solvent is removed and water is added. The product thereupon precipitates and is collected by filtration.

EXAMPLE 14

Preparation of capsule formulation

| Ingredient: | Milligrams per capsule |
|---|---|
| 3 - (2 - amino - 4 - thiazolyl) - 5 - ethoxy - 7-methylindole | 100 |
| Starch | 80 |
| Magnesium stearate | 5 |

The active ingredient, starch and magnesium stearate are blended together. The mixture is used to fill hard shell capsules of a suitable size at a fill weight of 185 milligrams per capsule.

EXAMPLE 15

Preparation of table formulation

| Ingredient: | Milligrams per tablet |
|---|---|
| 3 - (2 - amino - 4 - thiazolyl) - 2 - methyl - 5-ethylindole | 100 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120° F. The dry granules are passed through a No. 16 screen. The mixture is lubricated with magnesium stearate and compressed into tablets in a suitable tableting machine. Each tablet contains 100 milligrams of active ingredient.

EXAMPLE 16

Preparation of oral syrup formulation

| Ingredient: | Amount, mg. |
|---|---|
| 3 - (2 - methylamino - 4 - thiazolyl) - 5,7 - diethylindole | 500 |
| Sodium benzoate | 150 |
| Sucaryl | 90 |
| Saccharin | 10 |
| Red Dye (F.D. & C. No. 2) | 10 |
| Cherry flavor | 50 |
| Sorbitol solution (70% N.F.) 40 ml. | |
| Distilled water: q.s. to 100 ml. | |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

EXAMPLE 17

Preparation of intramuscular formulation

| Ingredient: | Amount, percent |
|---|---|
| 3-(2-amino-4-thiazolyl)-2,5,7-trimethylindole | 2.5 |
| Parabens (4:1 mixture of methyl and propyl) | 0.1 |
| Water for injection | 100 |

The parabens are dissolved in about one-half the volume of water for injection at 80° C. with stirring. The solution is cooled to below 40° C. and the active ingredient is dissolved therein. The cooled solution is adjusted to final volume with water for injection and is then sterilized by sterile filtration through a suitable filter.

What is claimed is:

1. The method of inhibiting gastric acid secretion in a mammal in need of said treatment which comprises administering internally to said mammal a compound selected from the group consisting of those of the formula:

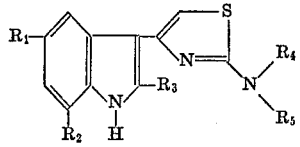

wherein $R_1$ is selected from the group consisting of hydrogen, methyl, ethyl, methoxy and ethoxy, $R_2$, $R_3$, $R_4$ and $R_5$ are each individually selected from the group consisting of hydrogen, methyl and ethyl, and the pharmacologically acceptable acid-addition salts thereof; in association with a pharmaceutical carrier to provide a daily dosage of from about 2 mg. to about 100 mg. per kilogram of body weight of said mammal.

2. The method according to claim 1 wherein $R_3$ is methyl and $R_1$, $R_2$, $R_4$ and $R_5$ are hydrogen.

3. The method according to claim 1 wherein $R_1$ is methoxy, $R_3$ is methyl and $R_2$, $R_4$ and $R_5$ are hydrogen.

4. The method according to claim 1 wherein $R_4$ is methyl and $R_1$, $R_2$, $R_3$ and $R_5$ are hydrogen.

5. The method according to claim 1 wherein $R_4$ is methyl, $R_5$ is methyl and $R_1$, $R_2$ and $R_3$ are hydrogen.

References Cited
UNITED STATES PATENTS
3,646,053    2/1972    Poletto et al. _____ 424—270

JEROME D. GOLDBERG, Primary Examiner